United States Patent Office 3,657,316
Patented Apr. 18, 1972

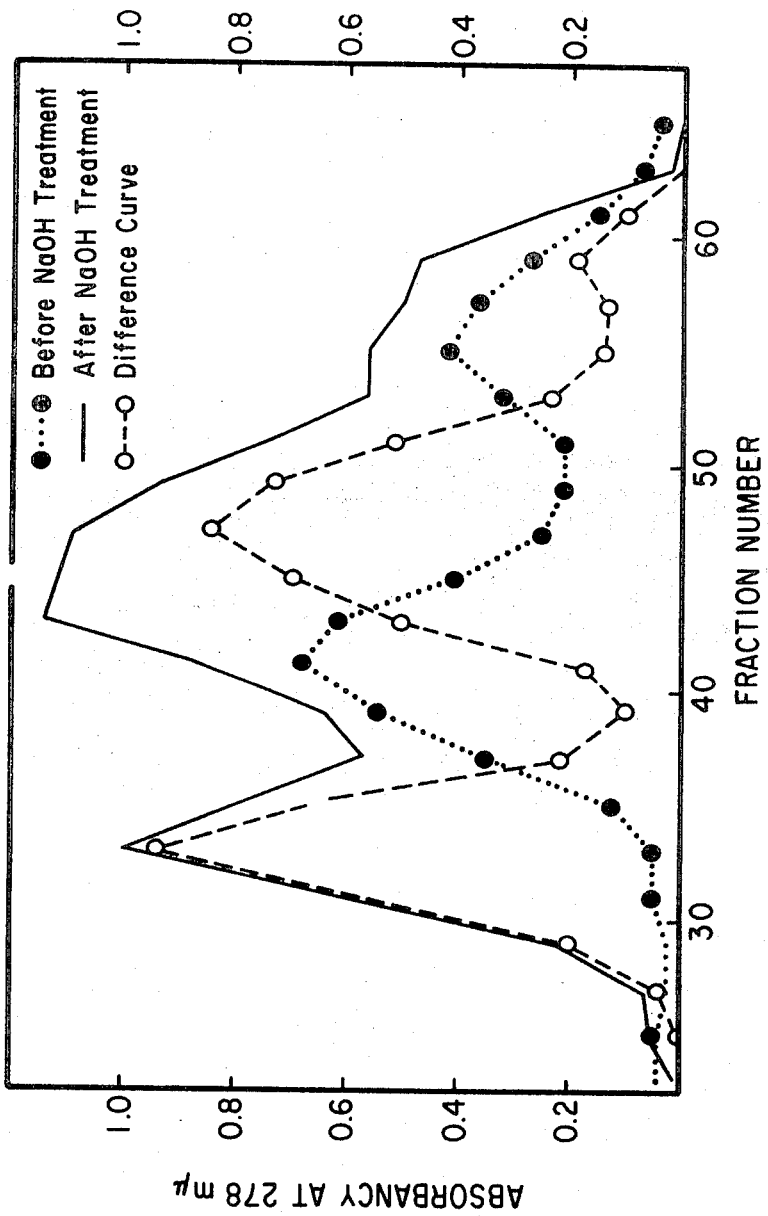
FIGURE 1. REVERSED PHASE PARTITION CHROMATOGRAPHY

3,657,316
15,19-DIHYDROXY-9-KETO-PROSTANOIC ACID
Bengt Samuelsson, % Royal Veterinary College, Department of Medical Chemistry, Stockholm 50, Sweden
Continuation-in-part of application Ser. No. 481,777, Aug. 23, 1965. This application Mar. 9, 1970, Ser. No. 17,829
Int. Cl. C07c 61/36, 69/16, 69/74
U.S. Cl. 260—468 R   8 Claims

ABSTRACT OF THE DISCLOSURE

The invention is a group of prostanoic acid derivatives of the formula:

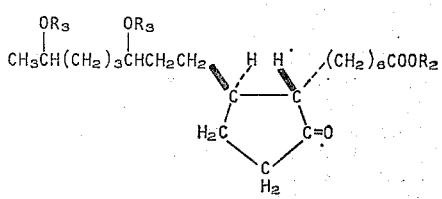

wherein $R_2$ is hydrogen, hydrocarbyl, or a pharmacologically acceptable cation, and $R_3$ is hydrogen or carboxyacyl. These compounds are useful for a variety of pharmacological purposes, including blood pressure lowering, anti-ulcer, and wound healing.

CROSS REFERENCE TO RELATED APPLICATION

This application is a continuation-in-part of my copending application Ser. No. 481,777, filed Aug. 23, 1965, now abandoned.

This invention relates to novel compositions of matter and to methods for obtaining and producing them. In particular, this invention relates to certain derivatives of prostanoic acid:

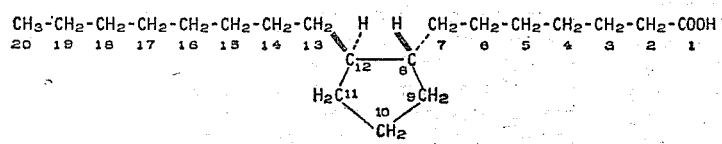

The hydrogen atoms attached to C-8 and C-12 in Formula I are in trans configuration. See Bergstrom et al., J. Biol. Chem., 238, 3555–3564 (1963), and Horton, Experientia, 21, 113 (1965).

The compounds of this invention include essentially pure compounds of the formula:

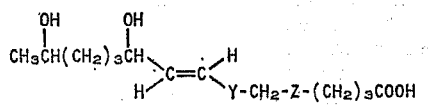

wherein Y is:

and Z is —$CH_2CH_2$— or cis-CH=CH—. Thus Formula II encompasses the following:

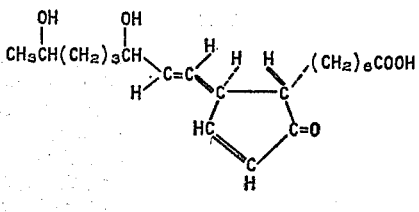

III

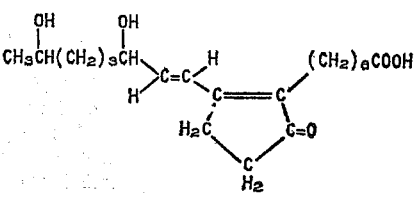

IV

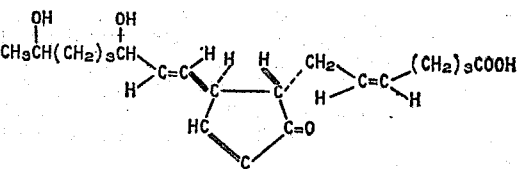

V

VI

Also included are pharmacologically acceptable salts of the above Formula II, III, IV, V, and VI prostanoic acids.

The compounds of this invention also include novel compounds of the formulas:

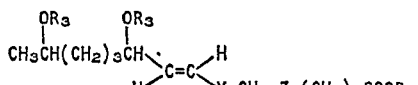

VII

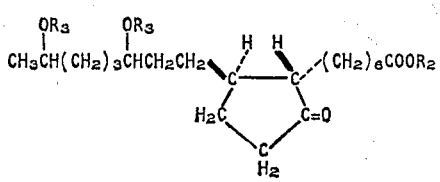

VIII wherein Y and Z are as given above, and wherein $R_2$ is hydrogen, hydrocarbyl, or a pharmacologically acceptable cation, and $R_3$ is hydrogen or carboxyacyl, provided that both $R_2$ and $R_3$ are not hydrogen in the Formula VII compounds. Preferably, the hydrocarbyl moiety contains one to about 10 carbon atoms. Among the hydrocarbyl moieties, lower alkyl is especially preferred. Preferably, the carboxyacyl moiety contains one to about 12 carbon atoms. Among the carboxyacyl moieties, lower alkanoyl is especially preferred.

Examples of lower alkyl, i.e., with one to about 8 carbon atoms, are methyl, ethyl, propyl, butyl, pentyl, hexyl, heptyl, octyl, and isomeric forms thereof. Examples of other hydrocarbyl moieties within the scope of this invention are nonyl, undecyl, allyl, crotyl, 3-butenyl, 5-hexenyl, propargyl, 4-pentynyl, cyclopentyl, 4-tert-butylcyclohexyl, cyclooctyl, benzyl, 2-naphthylmethyl, and the like.

Examples of lower alkanoyl, i.e., with one to about 8 carbon atoms are formyl, acetyl, propionyl, butyryl, valeryl, hexanoyl, heptanoyl, octanoyl, and isomeric forms thereof. Examples of other carboxyacyl moieties within the scope of this invention are decanoyl, crotonyl, cyclohexanecarbonyl, 3-cyclohexenecarbonyl, p-chlorophenoxyacetyl, phenylacetyl, succinyl, benzoyl, p-nitrobenzoyl, naphthoyl, furoyl, 3-pypridinecarbonyl, phthaloyl, and the like.

Pharmacologically acceptable cations within the scope of $R_2$ and $R_3$ in Formulas VII and VIII and within the scope of the pharmacologically acceptable salts of Formula II, III, IV, V, and VI prostanoic acids can be the cationic form of a metal, ammonia, or an amine, or can be quaternary ammonium ions. Especially preferred metal cations are those derived from the alkali metals, e.g., lithium, sodium, and potassium, and from the alkaline earth metals, e.g., magnesium, calcium, strontium, and barium, although the cationic form of other metals, e.g., aluminum, zinc, iron, and silver are within the scope of this invention.

Pharmacologically acceptable amine cations within the scope of this invention can be derived from primary, secondary, or tertiary amines. Examples of suitable amines are methylamine, dimethylamine, trimethylamine, ethylamine, decylamine, allylamine, crotylamine, cyclopentylamine, dicyclohexylamine, benzylamine, dibenzylamine, α - phenylethylamine, β - phenylethylamine, ethylenediamine, diethylenetriamine, and like lower-aliphatic, lower-cycloaliphatic and lower-aralphatic amines containing up to and including about 18 carbon atoms, as well as heterocyclic amines such as piperidine, morpholine, pyrrolidine, piperazine, and lower-alkyl derivatives thereof, such as 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups such as mono-, di-, and triethanolamines, ethyldiethanolamine, N-butylethanolamine, 2-amino-1-butanol, 2-amino-2-ethyl-1,3-propanediol, 2-amino-2-methyl-1-propanol, tris(hydroxymethyl)aminomethane, N-phenylethanolamine, N-(p-tert-amylphenyl)diethanolamine, galactamine, N - methylglucamine, N-methylglucosamine, ephedrine, phenylephrine, epinephrine, procaine, and the like.

Examples of suitable pharmacologically acceptable quaternary ammonium cations within the scope of this invention are tetramethylammonium, tetraethylammonium, benzyltrimethylammonium, phenyltriethylammonium, and the like.

Prostanoic acid derivatives of Formulas II, III, IV, V, VI, VII, and VIII are valuable therapeutic agents for the treatment of hypertension, in normalizing serum lipids and thus reducing the danger of ischaemic heart disease, and in treating central nervous system disorders in mammals including man. These compounds are administered by intravenous infusion of sterile isotonic saline solutions at the rate of about 0.01 to about 10, preferably, about 0.1 to about 0.2, microgram per kilogram of animal weight per minute. These compounds are also useful because they can be administered to laboratory animals, preferably rats, to produce animals containing high levels of the compounds. Such animals can then serve as test animals in the search for and study of compounds which are antagonists of the administered compounds and which, for that reason, would be useful in reversing the effects of inadvertent overdoses of the extremely potent Formula II, III, IV, V, VI, VII, and VIII compounds and in the treatment of allergic conditions. For that purpose, the Formula II, III, IV, V, VI, VII, or VIII compound is advantageously administered to the test animal by continuous intravenous infusion in sterile saline solution at the rate of about 0.01 to about 10, preferably 0.05 to 0.2, microgram per kilogram of animal weight per minute until the desired level of compound has been reached or until the desired response in the animal has been obtained. Infusion can then be continued or stopped depending on the particular use to be made of the test animal.

For any of the above purposes, there can be used either the free acid form or the pharmacologically acceptable salt form of Formula II compounds, or any of the forms encompassed by Formulas VII and VIII wherein $R_2$ and $R_3$ are as given above. With regard to the Formula VII and VIII compounds, however, it is especially preferred that hydrocarbyl be lower alkyl and that carboxyacyl be lower alkanoyl.

In addition to the above uses, the essentially pure Formula II compounds and the novel Formula VIII compounds wherein $R_2$ and $R_3$ are both hydrogen can be used as assay standards in the study of other animal tissues for the presence and content of this previously unrecognized class of prostanoic acids. Moreover, the above-mentioned salts of the Formula II compounds and the esters, carboxyacylates and their salts, and the ester-carboxyacylates of the Formula II compounds, encompassed by Formula VII, as well as the corresponding derivatives of the Formula VIII compounds are useful for upgrading the corresponding free hydroxycarboxylic acids, i.e., Formula II, and Formula VIII wherein $R_2$ and $R_3$ are both hydrogen. For that purpose, the free acid, free hydroxy compound, or free hydroxyacid is transformed to the ester, or salt and/or carboxyacylate. The ester, salt, and/or carboxyacylate is then purified by conventional techniques, for example, recrystallization or chromatography, and then hydrolyzed or otherwise transformed back to the free acid form and/or the free hydroxy form.

Prior to this invention, the only prostanoic acid derivatives isolated from natural sources have been substances designated prostaglandins. See, for example, Horton, Experientia, 15, 113–114 (1965). Each of the known prostaglandins is characterized by C–11α and C–15 hydroxy groups and a 13,14-trans double bond. In addition, prostaglandin E (PGE$_1$) has an oxo moiety at C–9; prostaglandin E$_2$ (PGE$_2$) has an oxo moiety at C–9 and a 5,6-cis double bond; prostaglandin E$_3$ (PGE$_3$) has an oxo moiety at C–9, and 5,6-cis and 17,18-cis double bonds; prostaglandin F$_{1\alpha}$ (PGF$_{1\alpha}$) has a C–9$\alpha$ hydroxy group; prostaglandin F$_{2\alpha}$ (PGF$_{2\alpha}$) has a C–9$\alpha$ hydroxy group and a 5,6-cis double bond; prostaglandin F$_{3\alpha}$ (PGF$_{3\alpha}$) has a C–9$\alpha$ hydroxy group, and 5,6-cis and 17,18-cis double bonds.

Other prostanic acid derivatives have been obtained by chemical transformations of the above-mentioned prostaglandins. For example, borohydride reduction of the C–9 oxo moiety of PGE, results in the formation of PGF$_{1\alpha}$ and the corresponding isomer with the C–9 hydroxy group in the $\alpha$ configuration, PGF$_{1\beta}$. See, for example, Bergström et al., Acta Chem. Scand., 16, 969–974 (1962).

Prior to this invention, prostanoic acid derivatives with oxygen at other than C–1, C–9, C–11, and C–15 had not been described. It has now been discovered that certain prostanoic acid derivatives with hydroxy groups at C–19 can be isolated from human seminal plasma by the novel process of this invention.

Earlier work with human seminal plasma resulted in the isolation of PGE$_1$, PGE$_2$, PGE$_3$, PGF$_{1\alpha}$, and PGF$_{2\alpha}$; Samuelsson, J. Biol. Chem. 238, 3229–3234 (1963). In that work, it was discovered that reversed phase partition chromatography on a hydrophobic diatomaceous earth (Super-Cel) support would separate individual "PGE type" compounds from each other, and individual "PGF type" compounds from each other, but would not completely separate the "PGE type" compounds from the "PGF type" compounds. It was also discovered in that work that partition chromatography on silicic acid would separate "PGE type" mixtures from "PGF type" mixtures but would not separate the individual "PGE type" compounds from each other or the individual "PGF type" compounds from each other.

Also in the earlier work of Samuelsson, ibid., use was made of earlier observations that both "PGE type" and "PGF type" compound concentrations can be estimated by measuring smooth muscle-stimulating activity on isolated rabbit duodenum, the activity being expressed in PGE$_1$-intestinal units, one such unit corresponding to one microgram of a standard prepared from crystalline PGE$_1$. That measurement does not, of course, distinguish between "PGE type" and "PGF type" compounds.

In working with the "PGE type" compounds in human seminal plasma, Samuelsson, ibid., also used the earlier observation that treatment of a "PGE type" compound with sodium hydroxide solution causes formation of a chromophore with an ultraviolet absorption maximum at 278 m$\mu$. "PGF type" compounds do not form that chromophone on treatment with sodium hydroxide. Therefore, that reaction can be used to estimate "PGE type" compound concentrations but not "PGE type" compound concentrations.

The novel process of this invention differs in several substantial respects from the process described by Samuelsson, ibid. Hereinafter, for convenience, the latter process will be referred to as the Samuelsson process to distinguish it from the novel process of this invention.

In the Samuelsson process, the total mixture of smooth muscle-stimulating compounds was extracted from human seminal plasma, partitioned between petroleum ether and an ethanol-water solution, and then subjected to partition chromatography on silicic acid, various mixtures of ethyl acetate and benzene being used for elution, and the content of each eluate fraction being measured both by weight and by smooth muscle-stimulating activity, i.e., in terms of PGE$_1$-intestinal units. Next in the Samuelsson process, certain eluate fractions representing a peak of smooth muscle-stimulatory activity thought to be due to various "PGE-type" compounds were combined and subjected to a combination of reversed phase partition chromatography, partition chromatography, and thin layer chromatography, whereby PGE$_1$, PGE$_2$, and PGE$_3$ were separated, and isolated and identified as methyl esters.

Then, in the Samuelsson process, certain other eluate fractions representing another and slower moving peak of smooth muscle-stimulating activity thought to be caused by various "PGF-type" compounds were combined and subjected to reversed phase parition chromatography, the content of each eluate fraction being measured by smooth muscle-stimulatory activity. Certain eluate fractions from the latter chromatographic process, representing a peak of smooth muscle-stimulating activity, were combined and evaporated to give a residue which was treated with diazomethane to produce methyl esters of the various prostanoic acids in those fractions. That methyl ester mixture was then subjected to thin layer chromatography whereby the methyl ester of PGF$_{1\alpha}$ and the methyl ester of PGF$_{2\alpha}$ were separated, isolated, and identified.

In the novel process of this invention, the acidic fraction of a lipid extract of human seminal plasma is obtained by extraction and preliminary purification, substantially as described by Samuelsson, ibid. That acidic fraction is then subjected to partition chromatography on silicic acid, substantially as described by Samuelsson, ibid., except that the content of each eluate fraction is measured by evaporating an aliquot of each fraction to dryness, treating the residue with 0.5 N sodium hydroxide in 50% aqueous ethanol, and, after 30 minutes, measuring the ultraviolet absorbancy at 278 m$\mu$.

By plotting eluate fraction number against ultraviolet absorbancy at 278 m$\mu$, four main peaks of absorbancy are observed in this novel process. When a small amount of PGF$_{3\alpha}$ containing tritium in place of hydrogen on the 9-hydroxyl group is added to the mixture prior to the partition chromatography, and the tritium activity of the various eluate fractions measured, a single peak of tritium activity is observed. That tritium activity peak coincides roughly with the third peak (in order of ease of elution from the chromatogram) of ultraviolet absorbancy.

Since it was observed by Samuelsson, ibid., that "PGF-type" compounds are present in human seminal plasma, and since partition chromatography or silicic acid as described by Samuelsson, ibid., does not separate the individual "PGF-type" compounds from each other, the third peak of ultraviolet absorbancy obtained by the novel process of this invention must contain all of the "PGF-type" compounds in the human seminal plasma.

As mentioned above, it is known that "PGF-type" compounds do not produce a chromophore which absorbs at 278 m$\mu$ on treatment with dilute sodium hydroxide solution. Therefore, it was completely unexpected and surprising that eluate fractions expected to contain "PGF-type" compounds would also contain compounds which give the 278 m$\mu$ chromophore on treatment with dilute sodium hydroxide solution. Thus, an essential part of the novel process of this invention is the step of detecting unexpected compounds with substantially the same mobility as "PGF-type" compounds during partition chromatography on silicic acid, by treatment of aliquots of eluate fractions with alkali metal hydroxides, preferably sodium hydroxide or potassium hydroxide, and preferably in dilute solution, and then measurement of the ultraviolet absorbancy of the treated eluate at 278 m$\mu$. The nature of the solvent is not critical as long as both alkali metal hydroxide and compounds to be treated are in solution together. A mixture of water and a lower alkanol such as methanol or ethanol is preferred. The eluate aliquot can be treated directly with the alkali metal hydroxide or the aliquot can first be evaporated to dryness.

Further in the novel process of this invention, the eluates of the third ultraviolet absorbancy peak, obtained by partition chromatography as described above by the novel process of this invention and containing the unexpected compounds of this invention as well as "PGF-type" compounds, are combined and subjected to reversed phase chromatography. An essential aspect of that novel reversed phase chromatography step of the novel process of this invention is that the step provide an essentially complete separation of $PGF_{1\alpha}$ and $PGF_{2\alpha}$ from the unexpected compounds of this invention. Another important aspect of this reversed phase chromatography step is that it provide a substantial although not necessarily complete separation of the unexpected compounds of this invention from each other.

The reversed phase partition chromatography which is part of the novel process of this invention is similar to that described by Norman et al., J. Biol. Chem., 233, 872–885 (1958). It was discovered quite unexpectedly, however, that use of a mixture of equal volumes of chloroform and isooctanol as the stationary phase on hydropholic kieselguhr (diatomite or diatomaceous earth), and a mixture of 114 volumes of methanol and 186 volumes of water as the moving phase would permit the compounds of this invention to pass through the chromatographic column substantially more rapidly than the $PGF_{1\alpha}$ and $PGF_{2\alpha}$, and thus be separated from the latter compounds. Moreover, by this novel chromatographic procedure, the four 19-hydroxyprostanic acids of this invention, i.e., the compounds of Formulas III, IV, V, and VI, quite unexpectedly moved through the chromatographic column at substantially different rates, thus effecting a substantial separation of those four compounds from each other.

The above-described novel reversed phase partition chromatographic separation differs from the reversed phase chromatographic separation described by Samuelsson, ibid., for the separation of $PGF_{1\alpha}$ and $PGF_{2\alpha}$ not only in the result obtained but also in the means of obtaining the result. A substantially smaller proportion of methanol is present in the moving phase in the novel process of this invention than was used in the Samuelsson process. The latter process used a moving phase containing 135 volumes of methanol and 165 volumes of water. In the novel process of this invention, 114 volumes of methanol and 186 volumes of water is present in the moving phase. In the novel process of this invention, the moving phase can contain methanol and water in volume-volume ratios ranging from about 110 volumes of methanol plus 190 volumes of water to about 120 volumes of methanol plus 180 volumes of water. When larger proportions of methanol are used, $PFG_{1a}$ and $PFG_{2a}$ tend to remain with the compounds of this invention during chromatography. When smaller amounts of methanol are used, the separation of the individual compounds of this invention is poorer than when a methanol-water mixture within the preferred range is used.

The above-described novel reversed phase chromatography process differs from the reversed phase part of the Samuelsson process in another significant manner. In the Samuelsson process, the content of the various eluate fractions from the reversed phase partition chromatography was determined by measuring smooth muscle-stimulatory activity of those fractions. In this part of the novel process of this invention, the content of the various eluate fractions was measured by determining the ultraviolet absorbancy of each fraction at 278 m$\mu$ both before and after treatment with a dilute alkali metal hydroxide solution, preferably sodium hydroxide or potassium hydroxide, as described above for the partition chromatography on silicic acid. Since the Samuelsson process had yielded only "PFG-type" compounds and since such compounds do not have a chromophore absorbing at 278 m$\mu$ nor yield such a chromophore on treatment with dilute alkali, it was completely unexpected and surprising that compounds could be detected in these eluate fractions in that manner.

By the above-described novel reversed phase partition chromatography process, a substantial separation of the unexpected compounds of this invention is obtained. The novel 19-hydroxyprostanoic acid of Formula V moves more rapidly on the chromatographic column than the other 19-hydroxyprostanoic acids of Formulas III, IV, and VI. Indeed, certain of the first group of eluate fractions obtained from the reversed phase chromatograms contain the Formula V 19-hydroxyprostanoic acid essentially free of Formula III, IV and VI 19-hydroxyprostanoic acids. Hence, as will be described in greater detail herein after, those fractions can be combined and the Formula V 19-hydroxyprostanoic acid isolated therefrom in essentially pure from by conventional techniques, for example, by evaporation of the solvents in the combined eluates. If desired, the essentially pure evaporation residue can be crystallized from a suitable solvent or mixture of solvents or subjected to chromatography, preferably preparative thin layer chromatography by the method of Gréen et al., J. Lipid Research 5, 117–120 (1964). Especially preferred as thin layer chromatography systems for that purpose are mixtures of ethyl acetate - acetic - methanol-2,2,4-trimethylpentane-water, especially 110:10:15:10:100 by volume, and mixtures of ethyl acetate-acetic acid - 2,2,4-trimethylpentane-water, especially 110:20:30:100 by volume.

The 19-hydroxyprostanoic acids of Formulas III and VI are usually not completely separated by the above-described novel reversed phase partition chromatographic process. When essentially pure samples of those compounds are desired, it is preferred to combine the various eluated fractions which contain them and then isolate the mixture by conventional methods, for example, evaporation of the solvents in the combined eluates. The mixture of the two 19-hydroxyprostanoic acids is then separated by preparative thin layer chromatography as described by Gréen et al., ibid., preferably using silica gel containing a small amount of silver nitrate, advantageously, about one part by weight of silver nitrate to about 25 parts of the silver gel, added as described by Gréen et al., ibid. Also, it is preferred to use a mixture of ethyl acetate-acetic acid-methanol-2,2,4-trimethylpentane-water, especially 110:10:15:10:100 by volume as the solvent system. With that preferred procedure, the Formula III 19-hydroxyprostanoic acid has an $R_f$ value about 0.68 and the Formula VI 19-hydroxyprostanoic acid has an $R_f$ value about 0.48, thus indicating essentially complete separation. The essentially pure Formula III and Formula VI 19-hydroxyprostanoic acids can be isolated from the thin layer chromatogram by conventional techniques, for example, as described by Gréen et al., ibid.

The novel 19-hydroxyprostanoic acid of Formula IV moves more slowly on the reversed phase partition chromatographic column than any of the Formula III, V, and VI 19-hydroxyprostanoic acids. Therefore a group of the last eluated fractions from the reversed phase partition chromatograph will contain this substance in substantially pure form. However, small amounts of Formula III and perhaps traces of Formula VI 19-hydroxyprostanoic acids may be present in those final eluates. To obtain the Formula IV 19-hydroxyprostanoic acid in essentially pure form, the combined final eluate fractions are evaporated to dryness and the residue subjected to preparative thin layer chromatography as described by Gréen et al., ibid., preferably; using silica gel containing a small amount of silver nitrate as described above, and the specific ethyl acetate-acetic acid-methanol-2,2,4-trimethylpentane-water mixture described above. The Formula IV 19-hydroxyprostanoic acid is thereby separated from the other 19-hydroxyprostanoic acids and can be isolated according to the Gréen et al., ibid. The resulting essentially pure Formula IV 19-hydroxyprostanoic acid gives a single spot with $R_f$ 0.36 when subjected to thin layer chromatography silicic acid with a mixture of ethyl acetate-acetic acid - 2,2,4-trimethylpentane-water, 110:20:30:100

If it is desired to obtain only Formula IV and/or Formula VI 19-hydroxyprostanoic acids, i.e., only those compounds with $C_{8(12)}$ double bonds, it is advantageous to treat the entire mixture of prostanoic acids in the third ultraviolet absorbancy peak of the above-described silicic acid partition chromatogram with dilute alkali metal hydroxide solution, preferably substantially as described for the compound detection method in the above-described novel reversed phase partition chromatography except on an appropriately larger scale. That treatment converts the Formula III 19-hydroxyprostanoic acid to the Formula IV 19-hydroxyprostanoic acid, and the Formula V 19-hydroxyprostanoic acid to the Formula VI 19-hydroxyprostanoic acid. The reaction involved is isomerism of the $C_{10(11)}$ double bond to the $C_{8(12)}$ positon. It is the $C_{8(12)}$ double bond in conjugation with the 9-oxo group and the $C_{13(14)}$ double bond which is the chromophore that absorbs ultraviolet light at 278 m$\mu$. The resulting mixture of Formula IV and Formula VI 19-hydroxyprostanoic acids is then readily separated by the combination of the novel reversed phase partition chromatography and the novel preparative thin layer chromatography, each as described above. Essentially pure Formula IV and Formula VI 19-hydroxyprostanoic acids are thereby obtained.

Alternatively, the essentially pure Formula III and Formula V 19-hydroxyprostanoic acids can individually be transformed to essentially pure Formula IV and Formula VI 19-hydroxyprostanoic acids, respectively, by the above-described treatment with dilute alkali metal hydroxide solution.

The 19-hydroxyprostanoic acids of this invention, i.e., compounds of Formula II, including Formulas III, IV, V, and VI, can be transformed into various types of esters, for example, compounds of Formula VII wherein $R_2$ is a hydrocarbyl moiety and $R_3$ is hydrogen, wherein $R_3$ is a carboxyacyl moiety and $R_2$ is hydrogen or a pharmacologically acceptable cation, and wherein $R_2$ is a hydrocarbyl moiety and $R_3$ is a carboxyacyl moiety, all as defined above.

Esterification of the carboxyl moiety in Formula II 19-hydroxyprostanoic acids and in Formula VII compounds wherein $R_2$ is hydrogen and $R_3$ is hydrogen or carboxyacyl can be accomplished by interaction of the free acid with the appropriate diazohydrocarbon. For example, when diazomethane is thus used, methyl esters are produced. Similar use of diazoethane, diazobutane, 1-diazo-2-ethylhexane, cyclohexyldiazomethane, phenyldiazomethane, 1-diazo-2-propene, and the like gives ethyl, butyl, 2-ethylhexyl, cyclohexylmethyl, benzyl, allyl, and like esters of Formula II and Formula VII acids.

Esterification with diazohydrocarbons is carried out by mixing a solution of the diazohydrocarbon in a suitable inert solvent, preferably diethyl ether, with the prostanoic acid reactant, advantageously in the same or a different inert diluent. After the esterification reaction is complete, the solvent is removed by evaporation and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 389–394 (1954).

An alternative method for esterification of the carboxyl moiety of Formula II 19-hydroxyprostanoic acids comprises transformation of the free acid to the corresponding silver salt, followed by interaction of that salt with a hydrocarbyl iodide. Examples of suitable iodides are methyl iodide, ethyl iodide, butyl iodide, isobutyl iodide, tert-butyl iodide, decyl iodide, benzyl iodide, cyclohexyl iodide, crotyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

Carboxyacylation of the two hydroxy groups in Formula II 19-hydroxyprostanoic acids and in Formula VII compounds wherein $R_2$ is hydrogen or hydrocarbyl and $R_3$ is hydrogen is accomplished by interaction of the hydroxy compound with a carboxyacylating agent, preferably a carboxylic acid anhydride, for example, the anhydrides of alkanoic, cycloalkanoic, alkenoic, cycloalkenoic, aralkanoic, aromatic, and heterocyclic carboxylic acids. For example, use of acetic anhydride gives the corresponding diacetate. Similar use of propionic anhydride, butyric anhydride, isobutyric anhydride, acrylic anhydride, crotonic anhydride, cyclohexanecarboxylic anhydride, benzoic anhydride, naphthoic anhydride, p-chlorophenoxyacetic anhydride, and furoic anhydride gives the corresponding dicarboxyacylates.

The carboxyacylation is advantageously carried out by mixing the hydroxy compound and the acid anhydride preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxane, can be added. It is preferred to use enough of the tertiary amine to neutralize the carboxylic acid produced by the reaction as well as any free carboxyl groups present in the hydroxy compound reactant.

The carboxyacylation reaction is preferably carried out in the range of about 0° to about 100° C. The necessary reaction time will depend on such factors as the reaction temperature and the nature of the anhydride and tertiary amine reactants. With acetic anhydride, pyridine, and a 25° C. reaction temperature, a 12 to 24-hour reaction time should be used.

The carboxyacylated product is isolated from the reaction mixture by conventional methods. For example, the excess anhydride can be decomposed with water, and the resulting mixture acidified and then extracted with a solvent such as diethyl ether. The desired carboxyacylate will usually be extracted by the ether and is recoverable therefrom by evaporation. If desired, the carboxyacylate can be purified by conventional methods, preferably by chromatography.

The 19-hydroxyprostanoic acids of Formula II and their esters of Formula VII contain carbon-carbon double bonds which can be hydrogenated catalytically to produce Formula VIII compounds. During that hydrogenation, any carbon-carbon unsaturation in $R_2$ and/or $R_3$ is also usually hydrogenated. Although any of the noble metals or metal compounds usually used as catalysts for hydrogenation of carbon-carbon unsaturation can be used for this hydrogenation, it is preferred to use rhodium catalysts, advantageously deposited on a carrier, e.g., carbon. Some platinum catalysts may cause a partial hydrogenolysis or dehydration with loss of a hydroxy group. When some palladium catalysts are used, the hydrogenation may stop after less than all of the carbon-carbon double bonds have been saturated.

It is advantageous to use an excess of hydrogen, preferably at least twice the stoichiometric amount, i.e., 2 moles per mole of Formula III or Formula IV acids and 3 moles for Formula V or Formula VI acids. It is also advantageous to dissolve the Formula II or Formula VII compound in a neutral inert solvent, for example a lower alkanol such as methanol or ethanol, or a lower alkyl ester of a lower alkanoic acid, e.g., ethyl acetate or methyl propionate, and then add the catalyst. The resulting mixture is subjected to about one to about 10 atmospheres pressure of hydrogen at a temperature in the range of about 10° to about 50° C. until the theoretical amount of hydrogen has been absorbed. The desired Formula VIII compound can then be recovered from the reaction mixture by conventional methods, for example, filtration of the catalyst and evaporation of the solvent. If desired, the product can be purified by conventional methods, preferably by chromatography.

When $R_2$ in the Formula VIII reduction product is hydrogen, that acid can be transformed into a hydrocarbyl ester as described above for the other 19-hydroxyprostanoic acids. When $R_3$ in the Formula VIII reduction product is hydrogen, that hydroxy compound can be carboxyacylated as described above for the other 19-hydroxyprostanoic acids.

Each of the above-described 19-hydroxyprostanoic acids, i.e., Formula II and Formulas VII and VIII wherein $R_2$ is hydrogen can be transformed to pharmacologically acceptable salts by neutralization with appropriate amounts of the corresponding inorganic or organic base, examples of which correspond to the cations listed above. These transformations can be carried out by a variety of procedures known in the art to be generally useful for the preparation of inorganic, i.e., metal or ammonium, salts, amine acid addition salts, and quaternary ammonium salts. The choice of procedure will depend in part upon the solubility characteristics of the particular salt to be prepared. In the case of the inorganic salts, it is usually suitable to dissolve the 19-hydroxyprostanoic acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the Formula II, VII, or VIII 19-hydroxyprostanoic acid. Evaporation of the water or addition of a water-miscible solvent of moderate polarity, for example, a lower alkanol or a lower alkanone gives the solid inorganic salt if that form is desired.

To produce an amine salt, the 19-hydroxyprostanoic acid can be dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it can usually be obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the 19-hydroxyprostanoic acid with the stoichiometric amount of the corresponding quaternary ammonium hydroxide in water solution, followed by evaporation of the water.

The invention can be more fully understood by the following examples.

EXAMPLE 1

Isolation of 19-hydroxyprostanoic acids from human seminal plasma (A) Extraction and preliminary purification.—Samples of human seminal plasma were obtained from the source described by Samuelsson, ibid., and were added to ethanol and stored at −20° C. until processed.

A 650-ml. portion of plasma in 2000 ml. of ethanol was centrifuged at about 25° C., and the clear supernatant was decanted. The sediment was resuspended in 2500 ml. of ethanol and the mixture was centrifuged. The combined supernatants were filtered, and evaporated to 200 ml. at 10 mm. pressure and 40° C. The resulting solution was then mixed with 200 ml. of water, and the mixture was acidified to pH 3 with hydrochloric acid.

The acidified solution was extracted three times with diethyl ether. The diethyl ether extracts were combined and washed with successive portions of water until further water washings were neutral. The washed diethyl ether extracts were then evaporated to dryness under reduced pressure, and the residue was subjected to a three-stage distribution between petroleum ether and ethanol-water (2:1). The combined aqueous ethanol phases were evaporated to a small volume, and then diluted with water, acidified, and extracted three times with diethyl ether. The combined diethyl ether extracts were evaporated to give 541 mg. of residue.

(B) Partition chromatography on silicic acid.—The residue (541 mg.) from part A was mixed with 25 micrograms of $PGF_{3\alpha}$ containing tritium in place of hydrogen in the 9-hydroxy group. (Samuelsson, Biochem. Biophys. Acta 84, 709 (1964).) The mixture was then subjected to partition chromatography on 25 g. of silicic acid, eluting with benzene containing increasing concentrations of ehtyl acetate, as described by Samuelsson, ibid. Each eluate fraction was 42 ml. Fractions 1 to 6 were eluted with ethyl acetate-benzene 3:7 (v.:v.). Fractions 7 to 27 were eluted with ethyl acetate-benzene 6:4 (v.:v.). Fractions 28 to 39 were eluted with ethyl acetate-benzene 8:2 (v.:v.). A small aliquot of each fraction was evaporated to dryness, and the residue was mixed with 0.5 N sodium hydroxide in 50% aqueous ethanol and allowed to stand at about 25° C. for 30 minutes. The ultraviolet absorbancy at 278 m$\mu$ was then measured. Four main peaks of ultraviolet aborbancy were observed among the successive eluate fractions.

The radioactivity of each eluate fraction, and hence the $PFG_{3\alpha}$ content of each, was measured with a gas flow counter (Frieseke-Hoepfner FH 51) in the proportional range. The radioactive fractions coincided roughly with the third main peak of ultraviolet absorbancy.

(C) Reversed phase partition chromatography.—The eluate fractions representing the third peak of ultraviolet absorbancy were combined and evaporated to dryness to give 74 mg. of residue. That residue was subjected to reversed phase chromatography according to the procedures described by Norman et al., J. Biol. Chem. 233, 872 (1958). See also references cited in Norman et al. An 18-gram column was used. The moving phase of the solvent system was methanol-water 114:186 (v.:v.). The stationary phase of the solvent system was chloroform-isooctanol 15:15 (v.:v.). The ultraviolet absorbancy of an aliquot of each eluate fraction was measured at 278 m$\mu$ before and after treatment with sodium hydroxide solution as described in part B, above.

FIG. 1 shows the results obtained in the above-described reversed phase partition chromatography. The solid line represents absorbancy at 278 m$\mu$ for the various eluate fractions after treatment with sodium hydroxide solution. The dotted line with solid points represents absorbancy of the various eluate fractions before treatment with sodium hydroxide solution. The dashed line with open points represents the calculated difference in absorbancy between the solid line and the broken line with solid points. Thus each point on the broken line with open points represents an absorbancy increase due to treatment of an eluate fraction aliquot with sodium hydroxide solution, and hence is a measure of the amount of material in that fraction which does not absorb at 278 m$\mu$ before treatment with sodium hydroxide but which does absorb after that treatment.

(D) Thin layer chromatography and characterization.—Thin layer chromatography described below was carried out according to the procedures described by Greén et al., J. Lipid Research 5, 117–120 (1964). Two solvent systems were used. System A consisted of ethyl acetate-acetic acid-methanol - 2,2,4 - trimethylpentane-water. 110:10:15:10:100 by volume. System B consisted of ethyl acetate-acetic acid-2,2,4-trimethylpentane-water, 110:20:30:100 by volume. System A was used with a mixture of silica gel and silver nitrate, 25:1 by weight. System B was used witht silica gel. In both cases, the specific silica gel and the preparation and use of the plates was as described by Greén et al., ibid.

(a) Fractions 28 to 35 (see FIG. 1) from the above-described reversed phase partition chromatography were combined and evaporated to dryness to give 10 mg. of essentially pure 15,19 - dihydroxy - 9-oxoprosta-cis-5,10, trans-13-trienoic acid.

U.V. (ethanol): 217 m$\mu$ ($\epsilon$=10,000).
I.R. (principal bands; chloroform solution): 5.86, 6.31, 10.3 $\mu$
Thin layer chromatography: A single spot with $R_f$ 0.52 using solvent system A.
A single spot with $R_f$ 0.38 using solvent system B.

(b) Fractions 40 to 52 (see FIG. 1) from the above-described reversed phase partition chromatography were combined and evaporated to dryness to give 19 mg. of residue. Preparative thin layer chromatography according to Gréen et al., ibid., using solvent system A separated that residue into two essentially pure compounds, one with $R_f$ 0.68 and one with $R_f$ 0.48.

The compound with $R_f$ 0.68 was 15,19-dihydroxy-9-oxoprosta-10,trans-13-dienoic acid.

U.V. (ethanol): 217 m$\mu$ ($\epsilon$=11,000).
I.R. (principal bands; chloroform solution): 5.86, 6.31, 10.3 $\mu$.
Thin layer chromatography: A single spot with $R_f$ 0.38 using solvent system B.

The compound with $R_f$ 0.48 was 15,19-dihydroxy-9-oxoprosta-cis-5,8(12),trans-13-trienoic acid.

U.V. (ethanol): 278 m$\mu$ ($\epsilon$=20,000).
I.R. (principal bands; chloroform solution): 5.92, 6.09, 6.26, 10.3 $\mu$.
Thin layer chromatography: A single spot with $R_f$ 0.37 using solvent system B.

(c) Fractions 54 to 61 (see FIG. 1) from the above-described reversed phase partition chromatography were combined and evaporated to dryness to give a residue. Preparative thin layer chromatography according to Gréen et al., ibid., using solvent system A gave a spot from which essentially pure 15,19 - dihydroxy - 9 - oxoprosta-8(12),trans-13-dienoic acid was isolated.

U.V. (ethanol): 278 m$\mu$ ($\epsilon$=21,000).
I.R. (principal bands; chloroform solution): 5.92, 6.09, 6.26, 10.3 $\mu$.
Thin layer chromatography: A single spot with $R_F$ 0.36 using solvent system B.

EXAMPLE 2

Isolation of 8(12)unsaturated 19-hydroxyprostanoic acids from human seminal plasma Following the procedure of Example 1, parts A and B, the acidic fraction of a lipid extract of a batch of human seminal plasma was purified and subjected to partition chromatography on silicic acid. The eluate fractions containing the third main peak of ultraviolet absorbancy at 278 m$\mu$ were combined and evaporated to dryness to give 24 mg. of residue. That residue was then mixed with 0.5 N sodium hydroxide in 50% aqueous ethanol, and the mixture was heated for 45 minutes at 40° C. The resulting solution was then acidified and extracted repeatedly with diethyl ether. The diethyl ether extracts were combined and evaporated to dryness to give a residue which was subjected to reversed phase chromatography, following the procedure of Example 1, part C. Only two main peaks of ultraviolet absorbancy appeared. The eluate fractions containing the first peak of ultraviolet absorbancy were combined and evaporated to give 10.0 mg. of essentially pure 15,19-dihydroxy-9-oxoprosta-cis-5,8(12),trans-13-trienoic acid; thin layer chromatography as in Example 1, part D, gave a single spot with the same $R_f$ given in Example 1.

The eluate fractions containing the second peak of ultraviolet absorbancy were combined and evaporated to dryness to give 11.0 mg. of essentially pure 15,19-dihydroxy-9-oxoprosta-8(12),trans - 13 - dienoic acid; thin layer chromatography as in Example 1, part D, gave a single spot with the same $R_f$ given in Example 1.

EXAMPLE 3

Conversion of 10(11)-unsaturated 19-hydroxyprostanoic acids to 8(12)-unsaturated 19-hydroxyprostanoic acids Following the procedure described in Example 2 for the treatment of the 19-hydroxyprostanoic acid mixture with sodium hydroxide solution, essentially pure 15,19-dihydroxy-9-oxoprosta-10,trans-13-dienoic acid and essentially pure 15,10-dihydroxy - 9 - oxoprosta - cis-5,10,trans-13-trienoic acid were separately transformed by sodium hydroxide treatment to essentially pure 15,19-dihydroxy-9-oxoprosta-8(12),trans-13-dienoic acid and essentially pure 15,19-dihydroxy - 9 - oxoprosta - cis-5,8(12),trans-13-trienoic acid, respectively.

EXAMPLE 4

Methyl 15,19-dihydroxy-9-oxoprosta-10,trans-13-dienoate

Essentially pure 15,19-dihydroxy-9-oxoprosta-10,trans-13-dienoic acid (2 mg.) was dissolved in a mixture of methanol and diethyl ether 1:9. A diethyl ether solution of diazomethane (about 200 mg.) was added, and the mixture allowed to stand at about 25° C. for 5 minutes. The reaction mixture was then evaporated to dryness to give methyl 15,19 - dihydroxy-9-oxoprosta-10,trans-13-dienoate.

I.R. (principal bands; chloroform solution): 5.86, 6.31, 10.3$\mu$.
Mass spectrum: 279, 299, 317, 348, 366 m/e on apparatus of Ryhage, Arkiv Kemi, 16, 19 (1960).

EXAMPLE 5

Methyl 15,19-dihydroxy-9-oxoprosta-cis-5,10,trans-13-trienoate

Following the procedure of Example 4, essentially pure 15,19-dihydroxy-9-oxoprosta-cis-5,10,trans - 13 - trienoic acid was transformed to methyl 15,19-dihydroxy-9-oxoprosta-cis-5,10,trans-13-trienoate.

I.R. (principal bands; chloroform solution): 5.86, 6.31, 10.3$\mu$.
Mass spectrum: 315, 328, 346, 364 m/e on apparatus of Ryhage, ibid.
N.M.R.: Multiples at 5.25–5.50 and 5.50–5.75 p.p.m. ($\delta$); doublet at 1.15 p.p.m. ($\delta$); singlet at 1:25 p.p.m. ($\delta$). Spectrum taken with a Varian A–60 spectrophotometer on deuterochloroform solution with tetramethylsilane as internal standard.

EXAMPLE 6

Methyl 15,19-dihydroxy-9-oxoprosta-8(12),trans-13-dienoate

Following the procedure of Example 4, essentialy pure 15,19-dihydroxy-9-oxoprosta - 8(12),trans-13-dienoic acid was transformed to methyl 15,19-dihydroxy-9-oxoprosta-8(12),trans-13-dienoate.

I.R. (principal bands; chloroform solution): 5.92, 6.09, 6.26, 10.3$\mu$.

EXAMPLE 7

Methyl 15,19-dihydroxy-9-oxoprosta-cis-5,8(12),trans-13-trienoate

Following the procedure of Example 4, essentially pure 15,19-dihydroxy-9-oxoprosta-cis-5,8(12),cis-trans-13-trienoic acid was transformed to methyl 15,19-dihydroxy-9-oxoprosta-cis-5,8(12),trans-13-trienoate.

I.R. (principal bands; chloroform solution): 5.92, 6.09, 6.26, 10.3$\mu$.

Also following the procedure of Example 4 but substituting for diazomethane, diazoethane; diazobutane; 1-diazo - 2 - ethylhexane; cyclohexyldiazomethane; phenyldiazomethane; and diazopropene, there are obtained the ethyl, butyl, 2-ethylhexyl, cyclohexylmethyl, benzyl, and allyl esters, respectively, of 15,19-dihydroxy-9-oxoprosta-10,trans-13-dienoic acid. In the same manner, essentially pure 15,19-dihydroxy - 9 - oxoprosta-cis-5,10,trans-13-trienoic acid, 15,19 - dihydroxy-9-oxoprosta-8(12),trans-13-dienoic acid, and 15,19-dihydroxy-9-oxoprosta-cis-5,8-(12),trans-13-trienoic acid are transformed to the corresponding ethyl, butyl, 2-ethylhexyl, cyclohexylmethyl benzyl, and allyl esters.

EXAMPLE 8

Methyl 15,19-diacetoxy-9-oxoprosta-10,trans-13-dienoate

Methyl 15,19-dihydroxy-9-oxoprosta-10,trans-13-dienoate (2 mg.) was mixed with acetic anhydride (0.5 ml.) and pyridine (0.5 ml.). The resulting mixture was allowed to stand at 25° C. for 18 hours. The reaction mixture was then cooled with ice, diluted with water, and acidified with dilute hydrochloric acid to pH 1. That mixture was then extracted three times with diethyl ether. The diethyl extracts were combined and washed successively with 2 N hydrochloric acid, 1 N sodium bicarbonate solution, and water. The ether was then evaporated under reduced pressure to give methyl 15,19-diacetoxy-9-oxoprosta-10,trans-13-dienoate. On oxidative ozonolysis followed by reaction with diazomethane, that compound gave methyl 2,6-diacetoxyheptanoate and trimethyl octane-1,2,8-tricarboxylate.

Following the procedure of Example 8, methyl 15,19-dihydroxy-9-oxoprosta-8(12), trans-13-dienoate, methyl 15,19-dihydroxy-9-oxoprosta-cis-5,10, trans-13-trienoate, and methyl 15,19-dihydroxy-9-oxoprosta-cis-5,8(12), trans-13-trienoate were transformed separately to methyl 15,19-diacetoxy-9-oxoprosta-8(12), trans-13-dienoate, methyl 15,19-diacetoxy-9-oxoprosta-cis-5,10, trans-13-trienoate, and methyl 15,19-diacetoxy-9-oxoprosta-cis-5,8(12), trans-13-trienoate, respectively. On oxidative ozonolysis followed by reaction with diazomethane, the methyl 15,19-diacetoxy-9-oxoprosta-cis-5,10, trans-13-trienoate gave dimethyl glutarate, trimethyl tricarballylate, and methyl 2,6-diacetoxyheptanoate.

Also following the procedure of Example 8 but substituting for the acetic anhydride, propionic anhydride; butyric anhydride; acrylic anhydride; crotonic anhydride; cyclohexanecarboxylic anhydride; benzoic anhydride; naphthoic anhydride; p-chlorophenoxyacetic anhydride; and furoic anhydride, there are obtained the corresponding 15,19-dicarboxyacyl derivatives of methyl 15,19-dihydroxy-9-oxoprosta-10,trans-13-dienoate. In a similar manner, the same 15,19-dicarboxyacyl derivatives of methyl 15,19-dihydroxy-9-oxoprosta-8(12), trans - 13 - dienoate, methyl 15,19-dihydroxy-9-oxoprosta-cis-5,10, trans-13-trienoate, and methyl 15,19-dihydroxy-9-oxoprosta-cis-5, 8(12, trans-13-trienoate is prepared. In a similar manner, each of the other esters of the novel 19-hydroxyprostanoic acids of this invention mentioned above is reacted with acetic anhydride or with each of the other above-mentioned anhydrides to produce the corresponding 15,19-dicarboxyacyl derivatives.

Also following the procedure of Example 8, essentially pure 15,19-dihydroxy-9-oxoprosta-10, trans-13-dienoic acid, 15,19-dihydroxy-9-oxoprosta-8(12), trans-13-dienoic acid, 15,19-dihydroxy-9-oxoprosta-cis-5,10, trans-13-trienoic acid, and 15,19-dihydroxy-9-oxoprosta-cis-5,8(12), trans-13-trienoic acid are each separately reacted with acetic anhydride or with each of the other above-mentioned anhydrides to produce the corresponding 15,19-dicarboxyacyl derivatives. In the latter cases, the sodium bicarbonate wash is omitted. Then, following the procedure of Example 4, each of those 15,19-diacyloxy dienoic and trienoic acids is separately reacted with diazomethane or with each of the other above-mentioned diazohydrocarbons to produce the same esterified dicarboxyacyl derivatives produced by the alternative route, i.e., first esterification and then carboxyacylation.

EXAMPLE 9

15,19-dihydroxy-9-oxoprostanoic acid

A mixture of essentially pure 15,19-dihydroxy-9-oxoprosta-cis-5,10, trans-13-trienoic acid (3 mg.), 5% rhodium on carbon (3 mg.), and ethanol (3 ml.) was shaken with hydrogen at about atmospheric pressure until 3 molecular equivalents of hydrogen had been absorbed. The catalyst was removed by filtration, and the filtrate was evaporated to dryness to give 15,19-dihydroxy-9-oxoprostanoic acid.

I.R. (principal band; chloroform solution): 5.78μ.
Mass spectrum: 283, 303, 321, 334, 352, 370 m./e. on apparatus of Ryhage, ibid.

Following the procedure of Example 9 but using essentially pure 15,19-dihydroxy-9-oxoprosta-10, trans-13-dienoic acid in place of 15,19-dihydroxy-9-oxoprosta-cis-5,10, trans-13-trienoic acid, the same 15,19-dihydroxy-9-oxoprostanoic acid is obtained following the uptake of 2 moles of hydrogen.

EXAMPLE 10

Methyl 15,19-dihydroxy-9-oxoprostanoate

Following the procedure of Example 4, 15,19-dihydroxy-9-oxoprostanoic acid was reacted with diazomethane to give methyl 15,19-dihydroxy-9-prostanoate.

Following the procedure of Example 10 but substituting for diazomethane, each of the specific diazohydrocarbons mentioned above, there are obtained the corresponding esters of 15,19-dihydroxy-9-oxoprostanoic acid.

EXAMPLE 11

15,19-diacetoxy-9-oxoprostanoic acid

Following the procedure of Example 8, 15,19-dihydroxy-9-oxoprostanoic acid is reacted with acetic anhydride in the presence of pyridine to give 15,19-diacetoxy-9-oxoprostanoic acid.

Also following the procedure of Example 8 but using each of the other above-mentioned anhydrides in place of acetic anhydride, 15,19 - dihydroxy - 9 - oxoprostanoic acid is transformed into 15,19-dicarboxyacyloxy-9-oxoprostanoic acids corresponding to each of said other anhydrides.

Also following the procedure of Example 8, each of the above-mentioned esters of 15,19-dihydroxy-9-oxoprostanoic acid is transformed to the corresponding 15,19-dicarboxyacyloxy-9-oxoprostanoic acid esters by reaction with acetic anhydride or with each of the above-mentioned anhydrides in the presence of pyridine.

Following the procedure of Example 10, 15,19-diacetoxy-9-oxoprostanoic acid is reacted with diazomethane to give methyl 15,19-diacetoxy-9-oxoprostanoate. Also following the procedure of Example 10, 15,19-diacetoxy-9-oxoprostanoic acid is reacted with each of the other above-mentioned diazohydrocarbons to give the corresponding esters of 15,19-diacetoxy-9-oxoprostanoic acid. Still following the procedure of Example 10, each of the other above-mentioned 15,19-dicarboxyacyloxy-9-oxoprostanoic acids is transformed by reaction with diazomethane or with each of the other above-mentioned diazohydrocarbons to give the corresponding 15,19-dicarboxyacyloxy-9-oxoprostanoic acid esters.

EXAMPLE 12

Methyl 15,19-dihydroxy-9-oxoprostanoate

Following the procedure of Example 9, methyl 15,19-dihydroxy-9-oxoprosta-cis-5,10 trans-13-trienoate was hydrogenated to give methyl 15,19-dihydroxy - 9 - oxoprostanoate, the same compound described in Example 10.

Following the procedure of Example 12 but using methyl 15,19-dihydroxy-9-oxoprosta-10, trans-13-dienoate in place of the methyl 15,19-dihydroxy-9-oxoprosta-cis-5,10, trans-13-trienoate, there is obtained the same methyl 15, 19-dihydroxy-9-oxoprostanoate.

Also following the procedure of Example 12 but using as hydrogenation reactants, each of the above-mentioned place of the methyl 15,19-dihydroxy-9-oxoprosta-cis-5,10, trans-13-trienoic acid or each of the above-mentioned specific esters of 15,19-dihydroxy-9-oxoprosta-10, trans-13-dienoic acid, there are obtained, in both cases, the same corresponding esters of 15,19-dihydroxy-9-oxoprostanoic acid, the same compounds described in Example 10.

EXAMPLE 13

15,19-diacetoxy-9-oxoprostanoic acid

Following the procedure of Example 9, 15,19-diacetoxy-9-oxoprosta-cis-5,10,trans-13-trienoic acid is hydrogenated to give 15,19-diacetoxy-9-oxoprostanoic acid, the same compound described in Example 11.

Also following the procedure of Example 9, 15,19-diacetoxy-9-oxoprosta-10,trans-13-dienoic acid is hydrogenated to give the same 15,19-diacetoxy-9-oxoprostanoic acid.

Still following the procedure of Example 9, but using as hydrogenation reactants, each of the above-mentioned specific 15,19 - dicarboxyacyloxy - 9 - oxoprosta-cis-5,10,- trans-13-trienoic acids or each of the above-mentioned specific 15,19 - dicarboxyacyloxy-9-oxoprosta-10,trans-13-dienoic acids, there are obtained, in both cases, the same corresponding 15,19-dicarboxyacyloxy - 9 - oxoprostanoic acids described in Example 11.

EXAMPLE 14

Methyl 15,19-Diacetoxy-9-oxoprostanoate

Following the procedure of Example 9 but using as the hydrogenation reactant, methyl 15,19 - diacetoxy-9-oxoprosta-cis-5,10,trans-13-trienoate, there is obtained methyl 15,19-diacetoxy-9-oxoprostanoate.

Also following the procedure of Example 9 but using as the hydrogenation reactant, methyl 15,19-diacetoxy-9-oxoprosta-10,trans-13-dienoate, there is obtained the same methyl 15,19 - diacetoxy - 9 - oxoprostanoate described above.

Also following the procedure of Example 9 but using as hydrogenation reactants, each of the above-mentioned esters of each of the above-mentioned specific esters of the above-mentioned specific 15,19-dicarboxyacyloxy-9-oxoprosta-cis-5,10,trans-13-trienoic acids or each of the above-mentioned specific esters of each of the above-mentioned specific 15,19-dicarboxyacyloxy - 9 - oxoprosta-10, trans - 13 - dienoic acids, there are obtained, in both cases, the same corresponding esters of the corresponding 15,19 - dicarboxyacyloxy-9-oxoprostanoic acids described above.

EXAMPLE 15

Sodium 15,19-dihydroxy-9-oxoprosta-10,trans-13-dienoate

Essentially pure 15,19-dihydroxy-9-oxoprosta-10,trans-13-dienoic acid (2 mg.) was dissolved in 3 ml. of water-ethanol 1:1. The solution was cooled to about 10° C. and was neutralized with an equivalent amount of 0.1 N aqueous sodium hydroxide solution. Evaporation to dryness gave essentially pure sodium 15,19 - dihydroxy - 9 - oxoprosta-10,trans-13-dienoate.

Following the procedure of Example 15 but using in place of the essentially pure 15,19-dihydroxy-9-oxoprosta-10,trans-13-dienoic acid, essentially pure 15,19-dihydroxy-9-oxoprosta-cis-5,10,trans-13-trienoic acid; essentially pure 15,19-dihydroxy-9-oxoprosta-8(12),trans-13-dienoic acid; essentially pure 15,19-dihydroxy-9-oxoprosta-cis-5,8(12), trans-13-trienoic acid; 15,19-dihydroxy - 9 - oxoprostanoic acid; and 15,19-diacetoxy-9-oxoprostanoic acid, there are obtained the corresponding sodium salts.

Also following the procedure of Example 15 but using potassium hydroxide, calcium hydroxide, tetramethylammonium hydroxide, and benzyltrimethylammonium hydroxide, there are obtained the corresponding salts of essentially pure 15,19-dihydroxy-9-oxoprosta-10,trans-13-dienoic acid.

As discussed above, these novel Formulas II, III, IV, V, and VI prostanoic acid derivatives are obtained from human seminal plasma. These compounds are not useful for the intended purposes set forth hereinafter until most of the other constituents of human seminal plasma are removed. In other words, these novel compounds must be essentially free of ingredients and impurities which would materially affect the basic and novel characteristics of these compounds. These compounds are useful for the intended purposes only when essentially free of liquid diluents, pyrogens, antigens, enzymes, cellular material, other organic acids or salts thereof, and like constituents of human seminal plasma. Otherwise, undesirable side effects will occur when the compounds are used for the intended purposes.

I claim:

1. A compound of the formula:

$$\begin{array}{c} OR_3 \quad OR_3 \\ | \quad | \\ CH_3CH(CH_2)_3CHCH_2CH_2 \end{array} \quad \begin{array}{c} H \quad H \\ \diagdown C—C \diagup \end{array} \quad (CH_2)_6COOR_2$$

wherein $R_2$ is hydrogen, lower alkyl, or a pharmacologically acceptable cation, and $R_3$ is hydrogen or lower alkanoyl.

2. A compound according to claim 1 wherein $R_2$ and $R_3$ are hydrogen.

3. A compound according to claim 1 wherein $R_2$ is hydrogen and $R_3$ is lower alkanoyl.

4. A compound according to claim 3 wherein $R_3$ is acetyl.

5. A compound according to claim 1 wherein $R_2$ is lower alkyl and $R_3$ is hydrogen.

6. A compound according to claim 5 wherein $R_2$ is methyl.

7. A compound according to claim 1 wherein $R_2$ is lower alkyl and $R_3$ is lower alkanoyl.

8. A compound according to claim 7 wherein $R_2$ is methyl and $R_3$ is acetyl.

References Cited

Hamberg et al., Brochim. Biophys. Acta 106, 215 (1965).

Bergstrom et al., ArKiv for Kemi 20, 63 (1965).

LORRAINE A. WEINBERGER, Primary Examiner

R. GERSTL, Assistant Examiner

U.S. Cl. X.R.

260—211 R, 247.2 R, 268 R, 294 S, 326.3, 347.5, 410, 429.9, 430, 439 R, 448 R, 469, 471 R, 473 G, 476 R, 485 G, 501.1, 501.15, 501.17, 488 R; 424—305, 311, 317

UNITED STATES PATENT OFFICE
CERTIFICATE OF CORRECTION

Patent No. 3,657,316          Dated April 18, 1972

Inventor(s) Bengt Samuelsson

It is certified that error appears in the above-identified patent and that said Letters Patent are hereby corrected as shown below:

Column 3, lines 65-66, for "ethylamine, decylamine," read -- ethylamine, dibutylamine, triisopropylamine, N-methylhexylamine, decylamine, --. Column 6, line 44, for "or silicic" read -- on silicic --. Column 7, line 49, for "PFG$_{1\alpha}$ and PFG$_{2\alpha}$" read -- PGF$_{1\alpha}$ and PGF$_{2\alpha}$ --; line 69, for ' "PFG-Type" ' read -- "PGF-type" --. Column 8, line 13, for "pure from" read -- pure form --; line 22, for "-acetic-" read -- -acetic acid - --; line 31, for "eluated" read -- eluate --; line 55, for "eluated" read -- eluate --; line 56, for "chromatograph" read --chromatogram --. Column 11, lines 13-14, for "werein" read -- wherein --. Column 12, line 14, for "ehtyl" read -- ethyl --; line 24, for "aborbancy" read -- absorbancy --. Column 14, line 11, for "15,10-" read -- 15-19- --; line 46, for "Multiples" read -- Multiplets --; line 47, for "1:25" read -- 1.25 --; line 67, for "-5,8(12),cis-trans-" read -- -5,8(12),trans- --. Column 15, line 22, for "The diethyl" read -- The diethyl ether --; line 56, for "8(12,trans-" read -- 8(12),trans- --. Column 16, line 71, for "-5,10 trans-" read -- -5,10,trans- --. Column 17, line 6, for "place of the methyl 15,19-" read -- specific esters of 15,19- --. References, for "63 (1965)" read -- 63 (1962) --.

Signed and sealed this 26th day of December 1972.

(SEAL)
ATTEST:

EDWARD M. FLETCHER, JR.
Attesting Officer

ROBERT GOTTSCHALK
Commissioner of Patents